US012763943B2

(12) United States Patent
Nguyen

(10) Patent No.: US 12,763,943 B2
(45) Date of Patent: Oct. 13, 2026

(54) METHOD FOR AUTHENTICATING AN END-USER ACCOUNT, METHOD FOR SINGLE AUTHENTICATING WITHIN A CLUSTER OF HSM, AND METHOD FOR IMPLEMENTING ACCESS CONTROL

(71) Applicant: THALES DIS CPL USA, Inc., Belcamp, MD (US)

(72) Inventor: Thinh Nguyen, Beclamp, MD (US)

(73) Assignee: THALES DIS CPL USA, INC., Austin, TX (US)

( * ) Notice: Subject to any disclaimer, the term of this patent is extended or adjusted under 35 U.S.C. 154(b) by 197 days.

(21) Appl. No.: 17/242,670

(22) Filed: Apr. 28, 2021

(65) Prior Publication Data

US 2022/0353073 A1 Nov. 3, 2022

(51) Int. Cl.
*H04L 9/08* (2006.01)
*H04L 9/32* (2006.01)

(52) U.S. Cl.
CPC .......... *H04L 9/0877* (2013.01); *H04L 9/0825* (2013.01); *H04L 9/0894* (2013.01); *H04L 9/3226* (2013.01)

(58) Field of Classification Search
CPC ... H04L 9/0877; H04L 9/0825; H04L 9/0894; H04L 9/3226
USPC .......................................................... 713/171
See application file for complete search history.

(56) References Cited

U.S. PATENT DOCUMENTS 6,249,291 B1 * 6/2001 Popp ................... H04L 67/5683 345/473
7,209,970 B1 * 4/2007 Everson .................. H04L 63/08 709/227
10,095,549 B1 * 10/2018 Needham .............. G06F 21/602
11,522,683 B2 * 12/2022 Sofia ........................ H04L 9/088
2004/0059946 A1 * 3/2004 Price ..................... H04L 63/105 713/182
2008/0133514 A1 * 6/2008 Relyea .................. G06F 21/602 707/999.102
2009/0228959 A1 * 9/2009 Veiseh ................... G06Q 30/02 726/4

(Continued)

OTHER PUBLICATIONS

Safenet: "All Rights Reserved PCI-E Cryptographic module Security Target Used as a Standalone Device or as an Embedded Device in Luna ® SA Evaluation as According to Common Criteria EAL4+", (Dec. 5, 2017), XPO55593546, Retrieved from the Internet: URL:https://www.commoncriteriaportal.org/files/epfiles/¢ST!%20CR-3524_23%20-%20Security%20Target.pdf [retrieved on Jun. 3, 2019] pp. 3, 15, 24.

(Continued)

*Primary Examiner* — Moeen Khan

(57) ABSTRACT

The present invention provides a method for authenticating an end-user account associated with at least one cryptographic key stored in the form of a PKA object within a HSM, wherein the method comprises the following steps:

creating a PKA object comprising authentication data, PKA-based user object, this authentication data at least comprising the log-in credentials of the end-user account, receiving, by the HSM, log-in credentials of the end-user account for retrieving and instantiating the PKA-based user object at session level, and authenticating, by the HSM, the PKA-based user object using a PKCS #11.

18 Claims, 13 Drawing Sheets

(56) References Cited

U.S. PATENT DOCUMENTS

| | | | | |
|---|---|---|---|---|
| 2010/0033300 | A1* | 2/2010 | Brandin | G06F 21/6218 340/5.8 |
| 2015/0358161 | A1* | 12/2015 | Kancharla | H04L 9/3234 713/164 |
| 2016/0028551 | A1 | 1/2016 | Hussain | |
| 2021/0051002 | A1* | 2/2021 | Cheng | H04L 9/088 |
| 2022/0067221 | A1* | 3/2022 | Schiattarella | G06F 21/602 |
| 2022/0247567 | A1* | 8/2022 | Ye | H04L 9/0825 |

OTHER PUBLICATIONS

Anonymous: "AskF5 : Release Notes: BIG-IP 12.1.0 New and Installation", (Apr. 18, 2019), XP055863246, Retrieved from the Internet: URL:https://techdocs.f5.com/kb/en-us/products/big-ip_1tm/releasenotes/product/relnote-1tm-12-1-0.html [retrieved on Nov. 18, 2021] p. 103.

PCT/US2022/024183, International Search Report, Jun. 30, 2022, European Patent Office, P.B. 5818 Patentlaan 2 NL 2280 HV Rijswijk.

PCT/US2022/024183, Written Opinion of the International Search Authority, Jun. 30, 2022, European Patent Office D-80298 Munich.

* cited by examiner

METHOD FOR AUTHENTICATING AN END-USER ACCOUNT, METHOD FOR SINGLE AUTHENTICATING WITHIN A CLUSTER OF HSM, AND METHOD FOR IMPLEMENTING ACCESS CONTROL

TECHNICAL FIELD

The present invention relates to the technical field of authentication techniques by Hardware Security Modules ("HSMs") to end-user accounts. In particular, the invention facilitates authenticating end-user accounts in Per-Key Authorization ("PKA") context adding new functionalities without affecting the security boundary of an HSM or a cluster there of certified by the Federal Information Processing Standard ("FIPS") certification.

More particularly, the present invention allows cloud-based applications to support multi-user with Single Sign-On ("SSO") scenarios.

In further embodiments, the invention allows to implement Role-Based Access Control ("RBAC") without requiring an external entity such as an Identity Management server to set the permissions externally to the HSM.

BACKGROUND OF THE INVENTION

An HSM is a cryptography product or a dedicated crypto-processor specifically designed for the protection of the cryptographic key lifecycle. HSM, either alone or within a cluster, protects cryptographic infrastructure by securely managing, processing, and storing cryptographic keys inside hardened, tamper-resistant device(s). HSMs excel at securing cryptographic keys and provisioning encryption, decryption, authentication, and digital signing services for a wide range of applications. Therefore, access management protocols are typically deployed to restrict and secure access by authorized users and prevent intrusion from unauthorized users.

Briefly, an HSM demands the "route of trust" meaning that, by default, it trusts nothing and nobody but itself. Thus, implementing access control management by a third party such as an Identity Management become impossible or, at the very least, a cumbersome and failure-prone operation.

Nowadays, HSM products implement a specific interface for allowing applications to create and manipulate the cryptographic materials: the Public Key Cryptography Standards #11 ("PKCS #11"), also known as Cryptoki, developed by RSA Security.

PKCS #11 is used as a low-level interface to perform cryptographic operations without the need for the application to directly interface the HSM through its driver, thus representing HSMs with by common model being referred to as tokens. In this way, an application can therefore perform cryptographic operations such as encryption, decryption, signature generation, signature verification, and permanent key storage on any HSM, using the same independent command set.

Nevertheless, PKCS #11 has been designed for single user environment and only envisages two types of users for a single appliance:

i. a Security Officer ("SO") who can: initialize the HSM, create the SO credential, create/delete application partition(s), configure global HSM policies, or perform updates of the HSM firmware and appliance software;

ii. a Crypto User ("CU") who can: perform cryptographic functions via user applications (optional read-only role), create public objects only, or perform backup/restore of public objects on the partition.

In other words, PKCS #11 does not support the concept of end-user or end-user account that makes the security audit challenging when the end-user "A" is no different than the end-user "B", other than they are both a type of CU.

Nevertheless, since the SO has too many functions and roles giving rise to a complex setup for some applications, it was created in some recent versions of HSM firmware the figure of the Crypto Officer ("CO") who can: create and modify cryptographic objects (also on its partition), manage backup and restore operation (also for its partition), perform cryptographic functions via user applications, or initialize a Crypto User ("CU") role and reset the CU credential.

Therefore, in this entire description, the CO will be considered as a specific role of the SO and both terms will be used interchangeably.

This limitation is further amplified in the increasingly extended cloud-base applications that requires to support multi-user context and/or SSO functions.

Certainly, the HSM infrastructure might be enhanced to support modern authentication mechanisms but it is deemed not practical because of: (a) memory and processor resources are limited in the embedded system, and (b) certification issues to still comply with FIPS. Most often, the advance authentication process is outsourced to a centralize component outside of the HSM like an Identity Management server, that can decrease the integrity of the HSM by changing its security boundary.

In addition, the user types allowed in PKCS #11 has a very little focus on access control. This imposes limitations at the enterprise-end and cloud-based applications that need to give direct-line access to critical resources, e.g., certain cryptographic keys, inside the HSM.

Unfortunately, implementing an access control model such as RBAC (defining Users, Roles, and Permissions) in an embedded system like the HSM is not practical either and, therefore, the common solution is to build a custom access control around the HSM, thus leading again to security risks.

Thus, there is a need in the HSM industry for easing the manner to authenticate end-user accounts aiming at enabling the implementation of existing functionalities without affecting the security boundary of the HSM.

SUMMARY OF THE INVENTION

The present invention provides a solution for the aforementioned problems by a method for authenticating an end-user account associated with at least one cryptographic key according to claim 1, a method for single authenticating an end-user account within a cluster of HSM according to claim 7, and a method for implementing access control to at least one cryptographic key account according to claim 10. In dependent claims, preferred embodiments of the invention are defined.

In a first inventive aspect, the invention provides a method for authenticating an end-user account associated with at least one cryptographic key stored in the form of a Per-Key Authorization, PKA, object within a Hardware Security Module, HSM, wherein the method comprises the following steps:

creating a PKA object comprising authentication data, PKA-based user object, this authentication data at least comprising the log-in credentials of the end-user account, receiving, by the HSM, log-in credentials of the end-user account for retrieving and instantiating the PKA-based user object at session level, and authenticating, by the HSM, to the PKA-based user object using a Public-Key Cryptographic Standard #11.

As known, within PKCS #11 the HSM products manage and store, for instance, the cryptographic material as objects. Objects can be defined in one of four classes:

"Data objects" which are defined by an application,

Digital certificates in form of "Certificate objects",

"Key objects" which can be public, private or secret cryptographic keys, and

"Vendor-defined objects".

Access to objects within PKCS #11 is defined by the object type. Public objects are visible to any user or application, whereas private objects require that the user must be logged into that token in order to view them. As mentioned, for a specific application, PKCS #11 recognizes two types of users, namely a security officer (SO) and a crypto user (CU). In this case, the SO's only role is to initialize the HSM token and set the CU's access data.

In addition to this standard way to access and manage objects, PKA feature introduces additional data structures to key objects that are created and manipulated in the HSM allowing keys to be handled in the way that applications normally handle key material; but under the sole ownership and control of an end-user natural person or legal entity, for instance, an end-user account.

In particular, PKA feature adds among the attributes of the key object an authentication data which must be introduced by the owner before being able to use the cryptographic material.

Advantageously, the present invention uses PKA-based objects, or symmetric keys, to represent users. The SO can create users of type of SO or CU in the same way cryptographic objects are created. Thus, authenticating a user is equivalent to authenticating any other PKA-based object using PKCS #11 interface while the enforcement is done by the HSM itself, not by an external entity.

The PKA-based user object maintains its authentication state like any other attributes so that the application can check the status of user's authentication.

In other words, the authentication state of an object is defined and stored in the form of attributes. For example, "athenticationStatus" is an attribute that represents the status of the object and its value may be either "authenticated" or "notAuthenticated" at any time.

In addition, objects within PKCS #11 are further defined as either a token object or a session object. In a particular embodiment, the PKA-based user object is a session object. Session objects are temporary and only remain in existence while the session is open.

As known, generating a PKA-based object (or assign a pre-created and unassigned one with a particular user) is faster and easier than creating users of type of SO or CU in a traditional way. Additionally, a new end-user account can request to use a single-use key. Then, according to the invention, both can be generated or assigned "on-the-spot" in the HSM (or a partition thereof) thus allowing such user to perform the action (e.g., signing) and then the key is permanently deleted, with no copy existing anywhere.

In a particular embodiment, at least one cryptographic key is created in an assigned association state with the end-user account, and/or at least one cryptographic key is created in unassigned association state with the end-user account being late assigned thereto.

Therefore, before it is assigned, the key may not have an owner or user, being part of a pool of unassigned keys, waiting for posterior distribution. As known, keys do take some time to generate, so in times of high demand, it could be practical and convenient to have some ready-to-go.

In a particular embodiment, the PKA-based user object or a modified form thereof is stored encrypted in a database outside of the HSM accessible via API, so that initiation of the associated end-user account retrieves this encrypted form from the database and inserts it into the HSM for its decryption and authentication based on requesting the log-in credentials.

That is, PKA-based user objects or resource objects generated on the HSM are securely extracted as encrypted objects and inserted back into the HSM when authentication or the cryptographic operation, respectively, need to be performed.

In a preferred example, the PKA-based user object is stored as an encrypted "binary large object" ("blob"), preferably up to 64 KB in size, that can be decrypted only within the HSM. The application shall call an API function to retrieve and use the PKA-based user object.

Accordingly, a logged-in user in the token can perform an action that directs the application to retrieve his/her existing encrypted form from the database or repository and insert (i.e., decrypt) it into the HSM. Then, the copy of the PKA-based user object can be deleted from the HSM, but the archived, encrypted copy resides safely in the database for future retrieval and use.

In a particular embodiment, the encryption and decryption of the PKA-based user object or a modified form thereof is performed by the HSM computing a first symmetric key.

In a preferred embodiment, this first symmetric key is a dedicated ID key derived from a master encryption key.

In a particular embodiment, the PKA-based user object is created by a Crypto Officer.

In a particular embodiment, either a posterior setting in the log-in credentials of the end-user account or a log-out thereof revokes everything in cache of the HSM generated during the session about said PKA-based user object.

In a second inventive aspect, the invention provides a method for single authenticating an end-user account within a cluster of HSMs connected to each other through a secure communication channel, wherein the end-user account is represented by the PKA-based user object created according to any of the embodiments of the first inventive aspect. The method comprises the following steps:

i. authenticating, by a first HSM of the cluster, to the PKA-based user object according to any of the embodiments of the first inventive aspect, ii. serializing, by the first HSM, the PKA-based user object with the authenticated state, iii. encrypting said serial, by the first HSM, with a symmetric key or a derived form thereof shared among the HSMs forming the cluster, iv. propagating, by the first HSM, this encrypted serial through the secure communication channel, v. receiving, by at least a second HSM of the cluster, this encrypted serial, vi. decrypting the serial, by at least the second HSM, with the symmetric key, vii. authenticating, by at least the second HSM, to the PKA-based user object according to any of the embodiments of the first inventive aspect.

The serializing of the PKA-based user object with the authenticated state results in a blob to be encrypted by the HSM.

The HSM may use a dedicated record-encrypting key, or ID key, different for each PKA-based user object or, alternatively, use the same symmetric key for all PKA-based user objects.

In a particular embodiment, the ID key is a derived key from a master encryption key, "master key", shared among the HSMs forming the cluster. Therefore, regardless the ID key used by the HSM for encrypting the blob, any other HSM can decrypt it with the master key that never leaves the HSMs.

Advantageously, the end-user account must be authenticated only once even if there is a cluster of HSMs connected to each other. This implements SSO feature with multi-user scenarios without modifying the security boundary of the HSM cluster.

As defined, the SSO feature is achieved by extracting the authenticated PKA-based user object, with its current state (i.e., properly setting its attributes), out of the HSM and transferring it to another HSM when needed.

In a particular embodiment, the authenticated stated is reflected on the attributes of the PKA-based user object.

In a particular embodiment, the secure communication channel implements a cryptographic protocols of the type of a Transport Layer Security.

In a particular embodiment, the first HSM of the cluster propagates the encrypted serial through the secure communication channel only to one or more HSMs storing at least one cryptographic key associated to the end-user account.

In a third inventive aspect, the invention provides a method for implementing access control to at least one cryptographic key stored within a HSM by an end-user account, wherein the method comprises:

a. creating a PKA-based user object according to any of the embodiments of the first inventive aspect, the PKA-based user object further comprising a dedicated symmetric key associated with the end-user account,
b. creating at least one PKA object comprising the cryptographic key, PKA-based resource object, this PKA-based resource object being authenticable through an identifier encrypted with the symmetric key of the PKA-based user object, and
c. setting up the access permissions for each PKA-based resource object by means of its attributes.

This allows an application to define access control at the highest security level while the actual access is enforced directly by the HSM. In particular, it is created a framework for supporting RBAC based on the current HSM infrastructure, without deviating from its core functions: protecting key materials.

As known, there are three components in a RBAC framework: User, Role, and Permission. This invention used the PKA-based objects to model each of these three components.

First, as defined before, each end-user or end-user account is represented by a PKA-based user object which comprises its own authentication mechanism.

Second, according to this invention, a Role can also be a PKA-based object that is cryptographically protected by the HSM. Finally, the Permission all already model by the key material itself as in PKCS #11 attributes and supported functions.

Examples of attributes are: Class, Token, Label, Value, Object ID, or Serial Number. While examples of the supported functions can be to allow or not: Encrypt, Decrypt, Sign, Verify, Wrap, Unwrap.

Therefore, in a particular embodiment, the permissions (i.e., what the user is authorized to do with this cryptographic key) are set up for each PKA-based resource object by means of its supported functions of PKCS #11.

Users, Roles, and Permissions are created by the SO which can set complex relationships between them by using the API defined by PKCS #11. Advantageously, these relationships are cryptographically linked and enforced by the HSM itself, not a third party like an Identity Management server.

In a particular embodiment, the PKA-based resource object comprises sensitive and non-sensitive attributes wherein,

- the non-sensitive attributes comprise the encrypted identifier, and
- the sensitive attributes comprise at least the cryptographic key.

In a particular embodiment, the identifier is a random string. That is, a string of alphanumeric characters generated randomly.

In a particular embodiment, the PKA-based resource is assigned to the PKA-based user by at least setting its read-only parenting attributes.

In a particular embodiment, the permissions are at least one of the following:

- allow encryption,
- allow decryption,
- allow wrap,
- allow unwrap,
- allow signing,
- allow verifying.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

As it will be appreciated by one skilled in the art, aspects of the present invention may be embodied as a method or a system.

Herein below, it is considered a case in which the method according to the invention for authenticating an end-user account is implemented by, locally at a server side, an HSM, as a standalone and authentication device that does not need to cooperate with another device so as to carry out the functions that are described infra and that are carried out by the HSM.

According to another embodiment (not represented), the method for authenticating end-user account is implemented by a PC, as a Secure Element (SE) host device that cooperates with a Trusted Executed Environment (or TEE) that is adapted to carry out the functions that are carried out by the HSM and that are described infra by adding a secure execution environment in the TEE.

According to another embodiment (not represented), the invention method for authenticating end-user account is implemented by a (mobile) phone as an SE host device that cooperates with a SE chip that is adapted to carry out the functions that are carried out by the HSM and that are described infra by adding, in this SE chip, a secure data storage and a secure data processing. This SE chip may include an incorporated chip, like e.g., an embedded Universal Integrated Circuit Card (or eUICC) or an integrated Universal Integrated Circuit Card (or iUICC), in a terminal, as an SE host device, or a chip that is communicatively coupled to the terminal, as an SE host device, and included in a smart card (or another medium). In addition, this SE chip may be fixed to or removable from its host device. As removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device.

The invention does not impose any constraint as to a kind of the HSM type.

Figure 1:
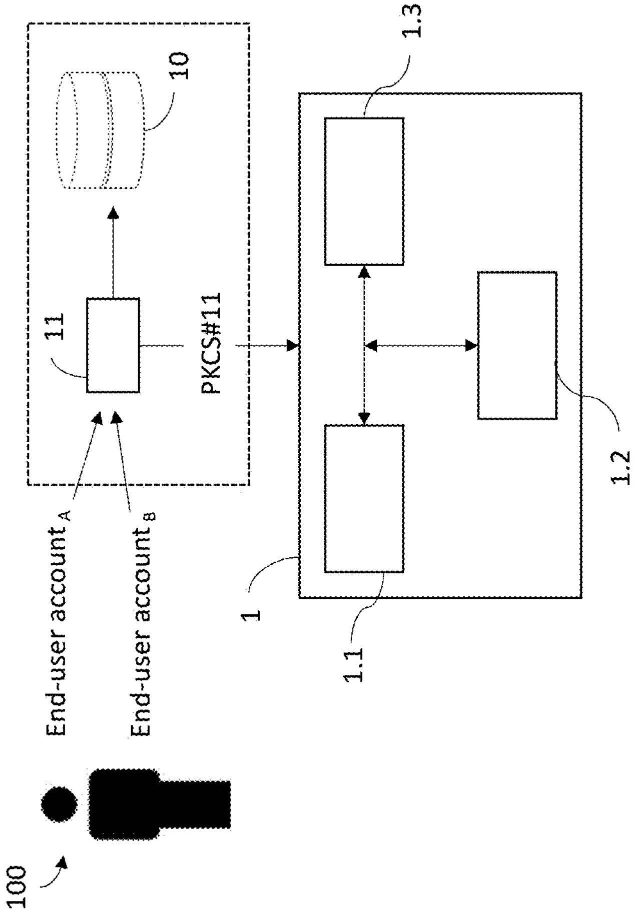
FIG. 1 This figure shows an embodiment of an HSM and a user.

FIG. 1 depicts schematically an authentication system or device such as a conventional HSM 1 storing a plurality of objects 2' to 2'''''. The HSM 1 is configured to receive, from a user 100 at least his/her login credentials for at least one of his/her end-user account(s) (A, B), verify them and let said user to access objects or resources within it.

The same user 100 may have one or several accounts (i.e., end-user accounts A, B), each with its own credentials. In order to avoid configuring the HSM to allow direct communication for each end-user account, an "agent 11" can be implemented. Throughout this document, an "agent 11" is a software entity that acts on the behalf of the running application to communicate with the HSM via PKCS #11 functions (e.g., typically through API calls). Thus, typically, it is featured by the personal device or terminal that the user 100 is using to interact the HSM 1 through the application.

As known, the figure of the agent 11 is a preferred feature but still optional as the user can always communicate with the HSM 1 through a dedicated interface of the HSM 1.

FIG. 1 also depicts an external database or storage means 10 where PKA-based objects or a modified form thereof can be stored encrypted in order to save HSM's memory resources and/or allow load-balancing features within a group of HSMs (so-called HSM cluster). Although only one is shown, more than one external databases 10 can be envisaged within this invention. This database is accessible by the agent 11 via, e.g., API.

The HSM (1) includes one or several (micro)processors (and/or a (micro)controller(s)) 1.1, as data processing means, comprising and/or being connected to one or several memories 1.2, as data storing means, comprising or being connected to means for interfacing with the user 100, such as a Man Machine Interface (or MMI), and comprising or being connected to an Input/Output (or I/O) interface(s) 1.3 that are internally all connected, through an internal bidirectional data bus.

The I/O interface(s) 1.3 may include a wired and/or a wireless interface, to exchange, over a contact and/or Contactless (or CTL) link(s), with the user 100. Within the present description, the adjective "CTL" denotes notably that the communication means communicates via one or several Short Range (or SR) type Radio Frequency (or RF) links.

The SR type RF link(s) may be related to any CTL technology that allows the HSM 1 to exchange locally data, through a CTL type link(s), with the user 100. The CTL link(s), when present, may include a BluetooTH (or BTH), a Bluetooth Low Energy (or BLE), a Wi-Fi, a ZigBee, a Near Field Communication (or NFC) type link(s) and/or any other SR type RF communication technology link(s).

Alternatively, instead of a CTL link(s), or additionally, the HSM 1 is connected, through a wire(s) or a cable(s) (not represented), to an end-user terminal or device (not represented) operated by the user 100.

The HSM MMI may include a display screen(s), a keyboard(s), a loudspeaker(s) and/or a camera(s) (not represented). The HSM MMI allows the user 100 to interact with the HSM 1. The HSM MMI may be used for getting data entered and/or provided by the user 100, such as user authentication data or login credentials, like e.g., a PIN and/or user biometric data (like e.g., a fingerprint(s), a facial print(s) and/or an iris print(s)).

The HSM memory(ies) 1.2 may include one or several volatile memories and/or one or several non-volatile memories. The HSM memory(ies) 1.2 may store e.g. a first and/or a last name(s) relating to the user 100, as a user ID(s), an International Mobile Equipment Identity (or IMEI), a Mobile Subscriber Integrated Services Digital Network number (or MSISDN), an Internet Protocol (or IP) address, an International Mobile Subscriber Identity (or I MSI), a Media Access Control (or MAC) address, an email address (es) and/or the like, as an ID(s) relating to each user (or device) to be authenticated.

The HSM memory(ies) 1.2 may store data, such as an ID(s) relating to the HSM, that allows identifying uniquely and addressing the HSM. The HSM ID(s) may include a unique ID, such as a UUID, a Uniform Resource Locator (or URL), a Uniform Resource ID (or URI), and/or other data that allows identifying uniquely and addressing the HSM.

The HSM memory(ies) 1.2 stores, for a specific user, preferably a UID, a token and/or authentication data in association with a predefined encrypted credential and associated (resource access) rights (or permission(s)). The encrypted credential is preferably loaded during a phase of registering (or enrolling) a user 100 (or his/her device) to be authenticated.

The concerned resource(s), as protected data, may include (non-executable) data, such as one or several data files or private data, and/or executable data, such as one or several application programs (i.e. code(s)) that, once executed, allow providing a corresponding service(s).

When a user 100 is to be authenticated, a corresponding user authentication is carried out by submitting to the HSM 1 an associated credential, as authentication data so as to be successfully authenticated. This authentication may additionally need of a physical token belonging to the user.

During a registration phase, the HSM 1 registers, i.e. stores or lets a cooperating device (not represented) that is connected or coupled to the HSM 1 store, for each user or a device thereof, specific data in association with an encrypted credential and one or several IDs for authentication. The specific data depends on data to be received, from the auxiliary device to be authenticated, so that the HSM retrieves the registered encrypted credential to be decrypted by the concerned device to authenticate.

The HSM 1 is configured to send data to or receive data from its interlocutor using a secure channel, such as e.g., a HyperText Transfer Protocol Secure (or HTTPS) type channel or any other secure data communication channel, in order to securely exchange data.

The HSM 1 is configured to verify, whether a (received) credential from the user is or is not valid. If the credential is not valid, then the HSM fails to authenticate the user or his/her device. Otherwise, i.e. if the credential is valid, the HSM authenticates successfully the user or device.

To ascertain that the credential is valid, the HSM is configured to retrieve a (previously stored) encrypted key (or Kenc). The HSM is configured to decrypt successfully the (retrieved) Kenc by using the (received) credential. The key (or K) in plain text, i.e. a non-encrypted key, has been used for encrypting one or several resources stored in form of objects that are authorized to be accessed.

Only when the credential is successfully validated or authenticated by the HSM, the HSM decrypts the encrypted resource(s) by using K, as a decrypted Kenc, in order to access the concerned resource(s) or objects.

Figure 2:
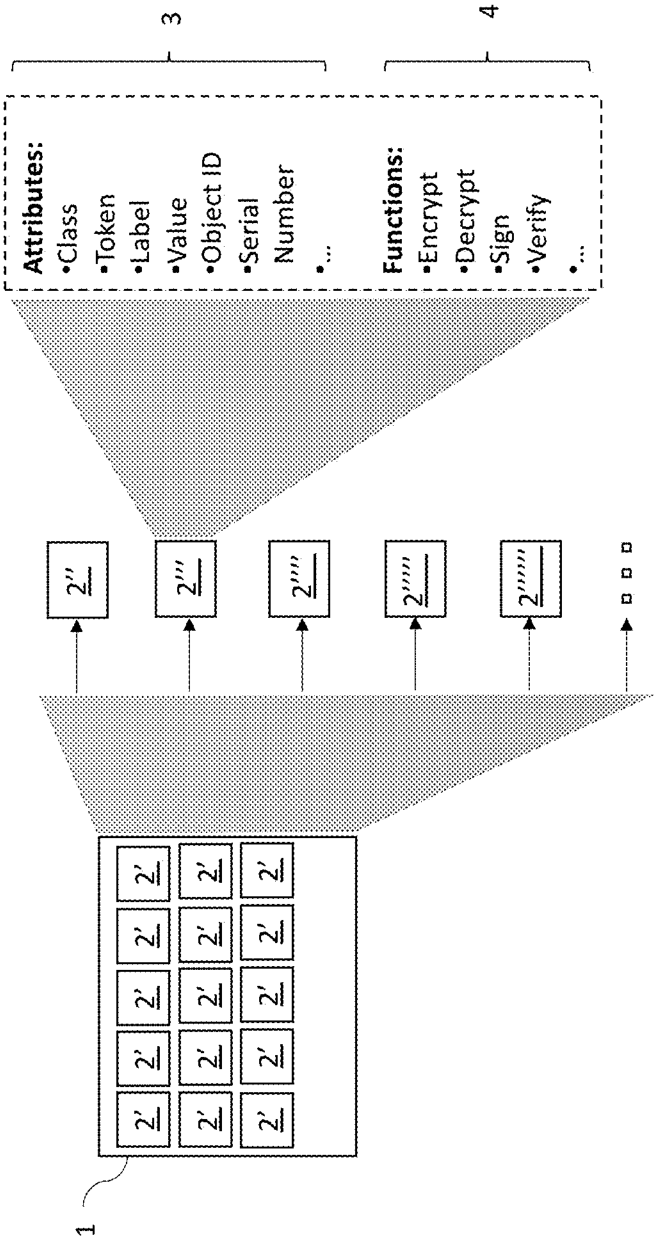
FIG. 2 This figure shows a schematic diagram of an HSM storing a plurality of objects.

In FIG. 2, it is schematically depicted an HSM (1) storing a plurality of objects (2' to 2''''') of one or more classes: "data object" (2''), "certificate object" (2'''), or "key objects" such as "public key object" (2''''), "private key object" (2'''''), "symmetry key object" (2'''''').

In addition, objects comprises different attributes such as: "class", "token", "label", "value", "object ID", or "serial number". The functions or operations to be performed with a particular object can be: "encrypt", "decrypt", "sign", "verify", among others.

Therefore, conventionally, when the user is authenticated to the HSM, he/she has access to all objects within it. The access includes reading/writing the value of the attributes as well as perform all operations (e.g., signing).

Figure 3B:
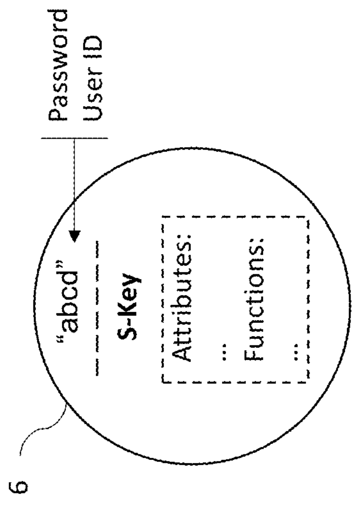
FIGS. 3*a*, 3*b* These figures show a schematic diagram of Per-Key Authentication-based Object, as well as a PKA-based user object according to the invention.
Figure 3A:
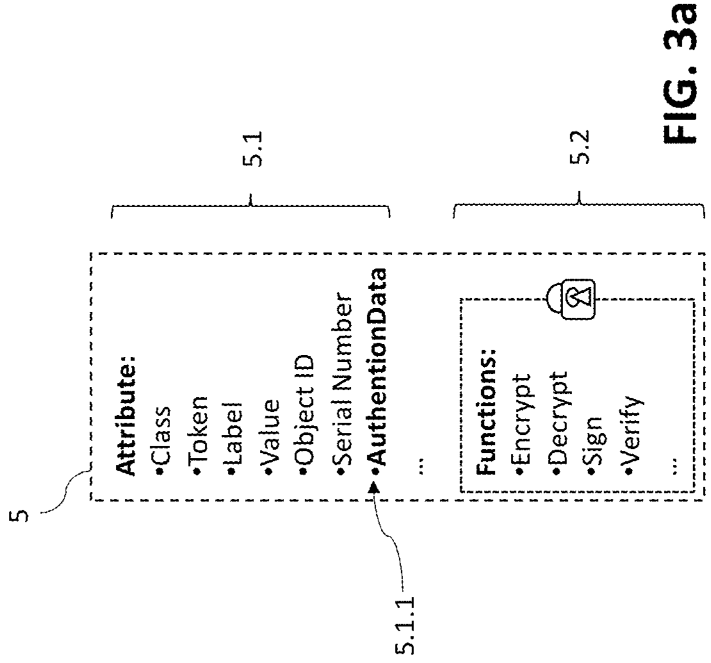

FIG. 3*a* depicts a schematic diagram of Per-Key Authentication or Authorization (PKA)-based object 5 used in the present invention. As it can be seen, PKA feature adds an additional attribute 5.1 regarding the authentication data 5.1.1 that must be introduced by the key owner before being able to use the cryptographic material. That is, it is not enough to log-in into the HSM but each time the user 100 wants to use the key, the user requires additional authorization (through API) in order to perform operations 5.2 on the key object. Advantageously, it provides access control on the operations as per object.

FIG. 3*b* depicts PKA-based user object 6 created according to the invention. As seen, the PKA-based user object is of the class of a symmetry key (S-Key) object and represents an end-user or end-user account by registering his/her login credentials within the attributes.

The log-in credentials are a credential, user ID, password, PIN and/or user biometric data.

Accordingly, creating or registering an end-user within the HSM 1 is similar to the creation of PKA key object with the exception that authenticating the end-user is now performed by authenticating the PKA-based user object with his/her log-in credentials. From the HSM point of view, the authentication workflow does not deviate from the standard PKCS #11 flow.

Therefore, the invention provides a method for authenticating an end-user account associated with at least one cryptographic key 7, 8 stored in the form of a PKA object within a HSM, wherein the method comprises the following steps:

- creating a PKA object comprising authentication data, PKA-based user object 6, this authentication data at least comprising the log-in credentials of the end-user account,
- receiving, by the HSM, log-in credentials of the end-user account for retrieving and instantiating the PKA-based user object at session level, and
- authenticating, by the HSM, the PKA-based user object using a Public-Key Cryptographic Standard #11.

The symmetry key S-Key of the PKA-based user object is used to link or associate cryptographically the resources or keys within the HSM or cluster of HSMs usable by that end-user account.

Moreover, a better track of the usage of this PKA-based user object can be assured since its instantiation by the HSM set its attributes to reflect this session initiation.

Thus, the end-user 100 opens a session in the service and logins in the HSM 1. The application or API, through PKCS #11, retrieves this PKA-based user object enforcing its authentication through the HSM thanks to the log-in credentials.

Figure 4A:
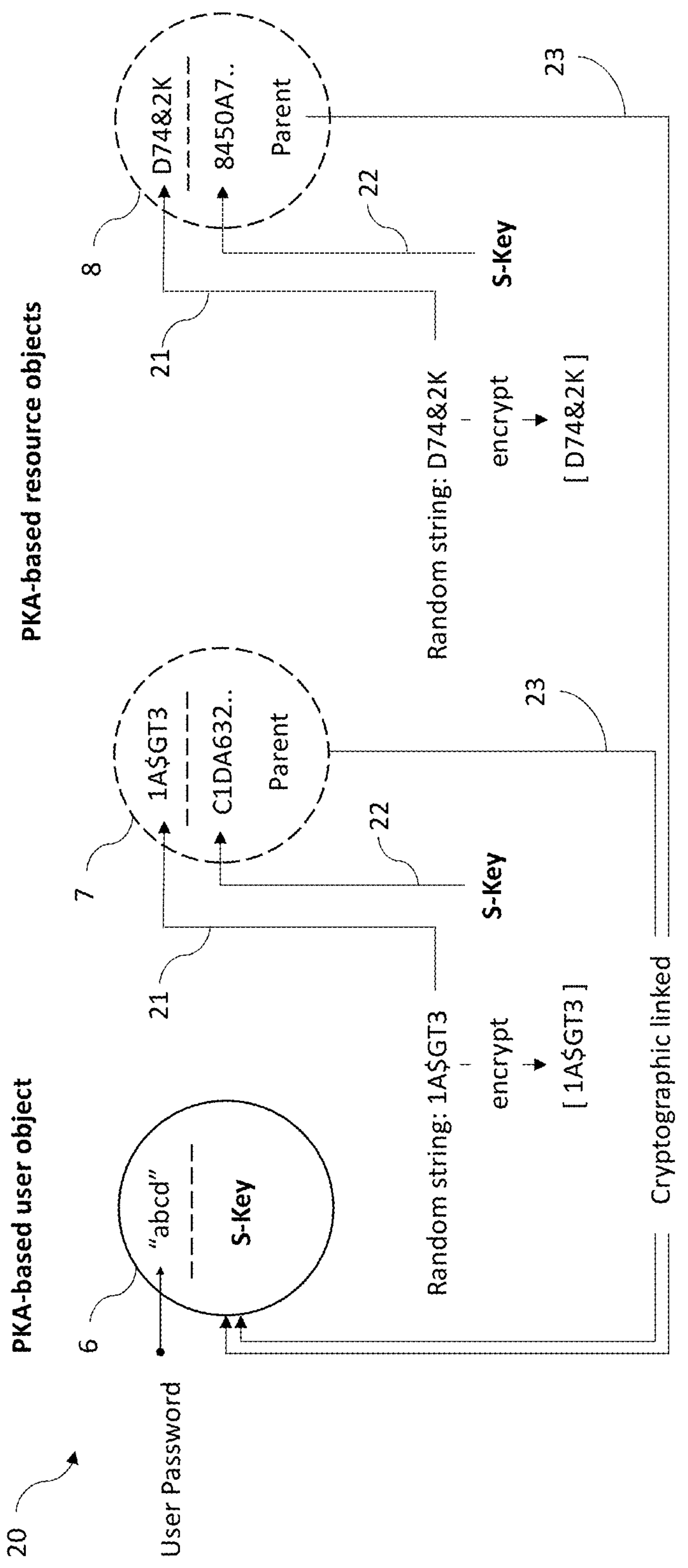
FIGS. 4*a* to 4*c* These figures show a schematic workflow of (a) a method to assign a PKA-base resource object to a PKA-based user object, (b) the resulting assignment, and (c) an authorization to use the PKA-base resource object.

FIG. 4*a* depicts a schematic workflow of a method 20 for assigning two PKA-based resource objects 7, 8 to a PKA-based user object 6.

First, it is generated 21 a different random string per PKA-based resource objects "1A$GT3", "D74&2K" and use them as the credentials or authentication data of these resources. Second, the PKA-based user object, namely, the symmetric key S-Key is used to encrypt 22 the just created credentials. Third, storing 23 the encrypted random strings in the non-sensitive attribute of the resources, thus creating the cryptographic links. In particular, the encrypted string "C1DA632 . . . " is stored in the non-sensitive attribute: encryptedCredential (see FIG. 4*b*).

Accordingly, the PKA-based resource objects 7, 8 can be authenticated to the HSM 1 through an identifier or a random string encrypted with the S-Key of the PKA-based user object 6. Furthermore, the attributes of each PKA-based resource objects 7, 8 refer to the PKA-based user object 6 as their parent.

Figure 4B:
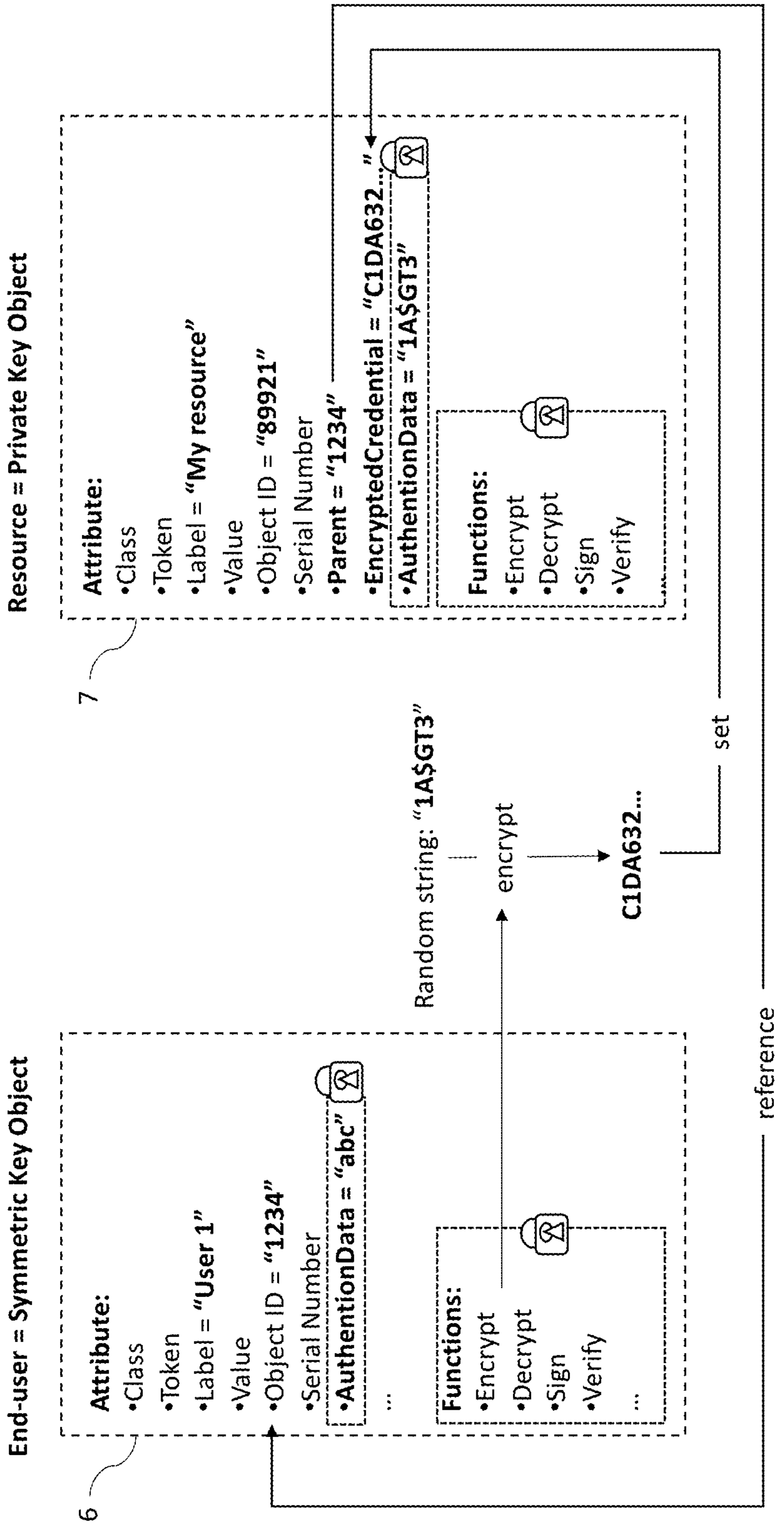

FIG. 4*b* depicts the resulting assignment. As it can be seen, after the user logins with his/her credential "abc", he/she is allowed to perform encryption/decryption operations. Then, the end-user creates the ownership of the PKA-based resource object 7 (only one PKA-based resource object for exemplary purposes) by setting the "Parent" attribute to the Object ID="1234", which is the PKA-based user object 6. Finally, the S-Key encrypts the generated random string "1A$GT3" to yield the encrypted string "C1DA632 . . . " which is afterwards stored it in the attribute: encryptedCredential, as mentioned.

It is to be noted that the PKA-based user objects does not need to specify their encryptedCredential attribute, this is only done by the PKA-based resource objects in order to create the cryptographic link with the assigned PKA-based user objects.

Therefore, it is created the cryptographic link between the PKA-based user object 6 and the PKA-based resource object 7 by setting the "authenticationData" attribute of the PKA-based resource object 7 to the value that can only be decrypted by "Object ID 1234". In other words, the AuthenticationData attribute of the PKA-based resource object is hidden and only accessible internally to the HSM 1.

Figure 4C:
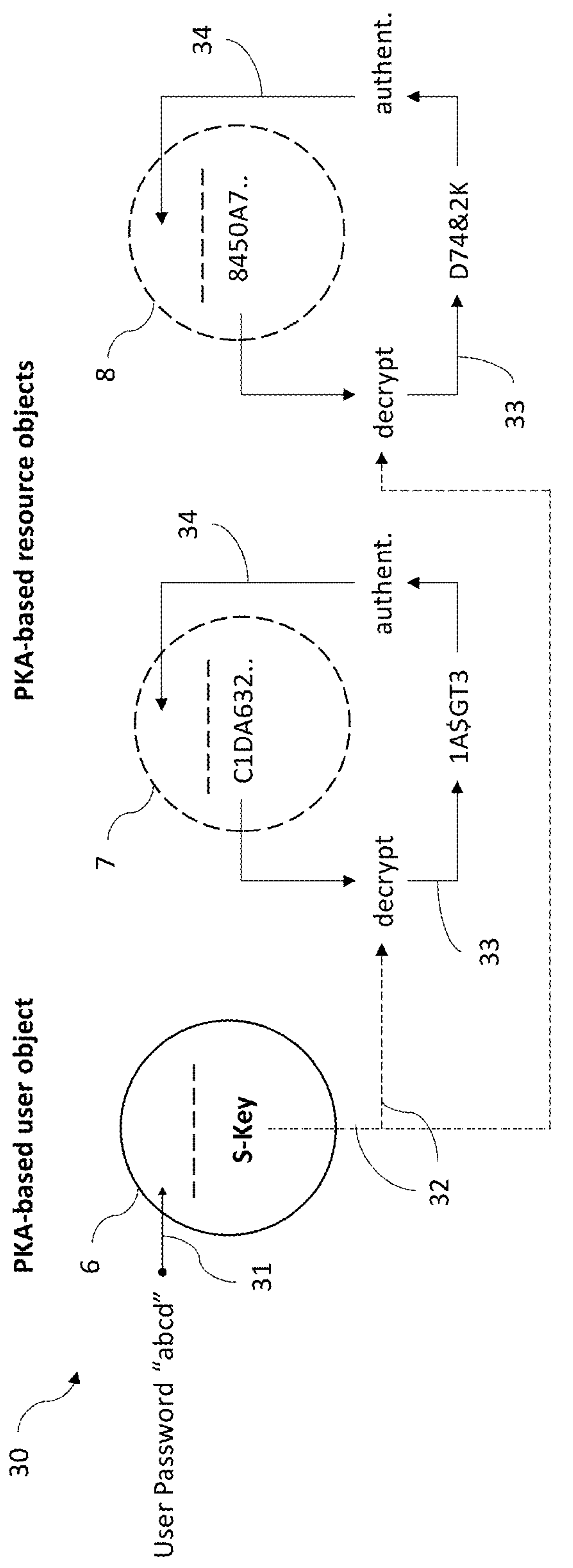

FIG. 4*c* depicts a workflow for the authorization 30 to use the assigned PKA-base resource objects 7, 8 by PKA-based user object 6. First, the end-user must authenticate 31 to obtain the right to use the S-key for decryption. Second, the end-user uses 32 the S-Key for decryption and decrypts 33 the non-sensitive attributes that comprises the encrypted credentials. Finally, the PKA-based resource objects 7, 8 are authenticated to the HSM to obtain the right for accessing and managing these resources according to his/her permissions.

Figure 5A:
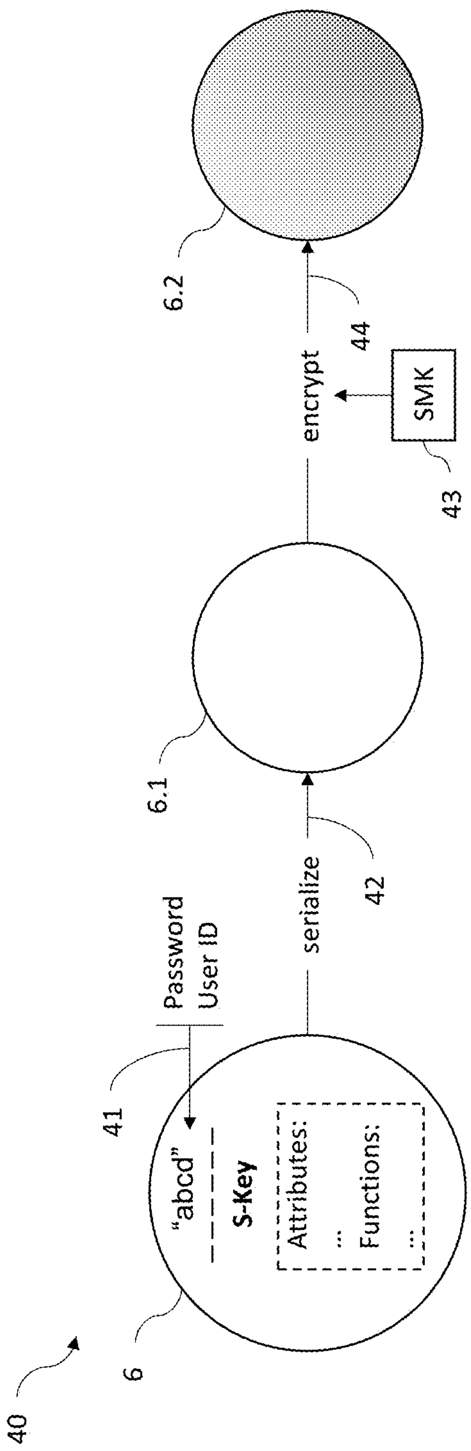
FIGS. 5*a*, 5*b* These figures show (a) a schematic workflow for extracting the PKA-based object out of the HSM, and (b) a schematic single sign-on of an end-user account within a cluster of HSMs.

FIG. 5*a* depicts a schematic workflow 40 for extracting the PKA-based user object 6 out of the $HSM_1$. After authenticating 41 the PKA-based user object 6 at the $HSM_1$, the PKA-based user object is serialized 42 (i.e., producing a "blob") with its authenticated state. Then, the resulting serial 6.1 is encrypted 44 by the $HSM_1$ with a retrieved 43 symmetric key that can be an ID key (different for each PKA-based user object) or the same symmetric key (symmetry master key, "SMK") for all PKA-based user objects. The encrypted serial 6.2 is then propagated 45 (see FIG. 4*b*), by the $HSM_1$, through a secure communication channel such as a Transport Layer Security 9.

Figure 5B:
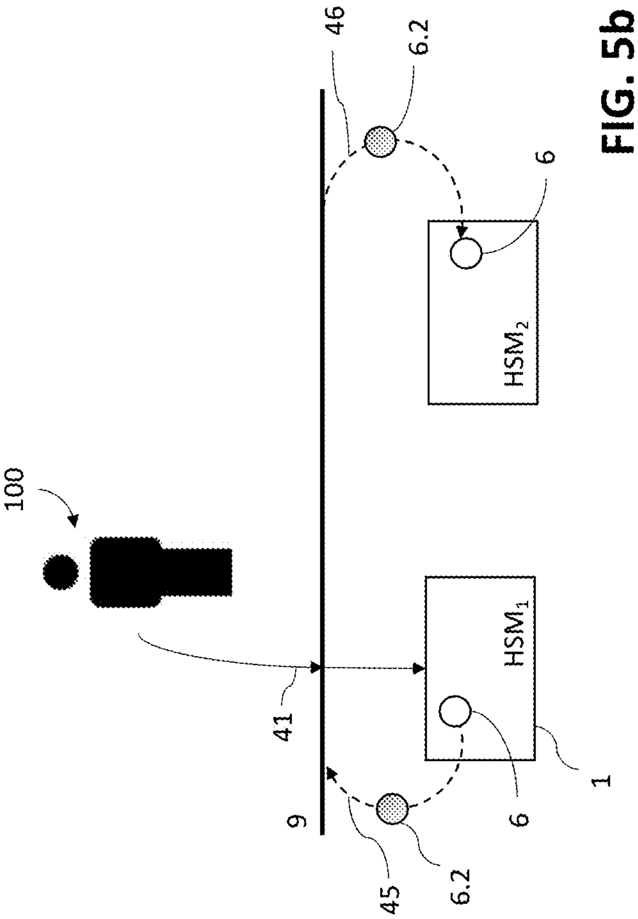

Therefore, the invention also provides a method for single authenticating an end-user account within a cluster of HSMs (i.e., $HSM_1$ and $HSM_2$) connected to each other through the secure communication channel. As shown in FIG. 5*b*, the encrypted serial 6.2 can be received, 46 by at least a second HSM (e.g., $HSM_2$) of the cluster.

Accordingly, this $HSM_2$ will decrypt the serial with the symmetric key and automatically authenticate the PKA-based user object. From an end-user point of view, it is a SSO because he or she is not requested to submit his/her credentials again in order to access to resources from different HSMs.

The representation of only $HSM_1$ and $HSM_2$ is for exemplary purposes, and the skilled person knows that more than two HSMs can be networked together to form a cluster such as the commercial Luna Network HSM products (e.g., version 7.7). In addition, $HSM_1$ and $HSM_2$ may represent partitions of another HSM. Alternatively or additionally, one HSM can be a back-up HSM.

Advantageously, with the present invention it is possible to transfer the authenticated state of that end-user account around different HSMs without relying in a centralized entity. Conventionally, it was necessary to centralize it by registering the user's state in an external entity like the Identity Management server. The blob is associated with accessing, so it is deleted as soon as the end-user account logout.

This PKA-based user object in the $HSM_2$ may exist already, or may not. Because of the stateless of the cluster, after being authenticated, it can be propagated to the $HSM_2$ and deleted from the $HSM_1$.

This is further advantageously for workload balancing in HSM clusters, because it is not possible to foresee in which HSM or partition the next operation will take place. Thus, when an new HSM join the cluster, that SMK will travel thereto. Accordingly, when the blob lands to the new HSM, it has already the secret key to decrypt it.

Figure 6A:
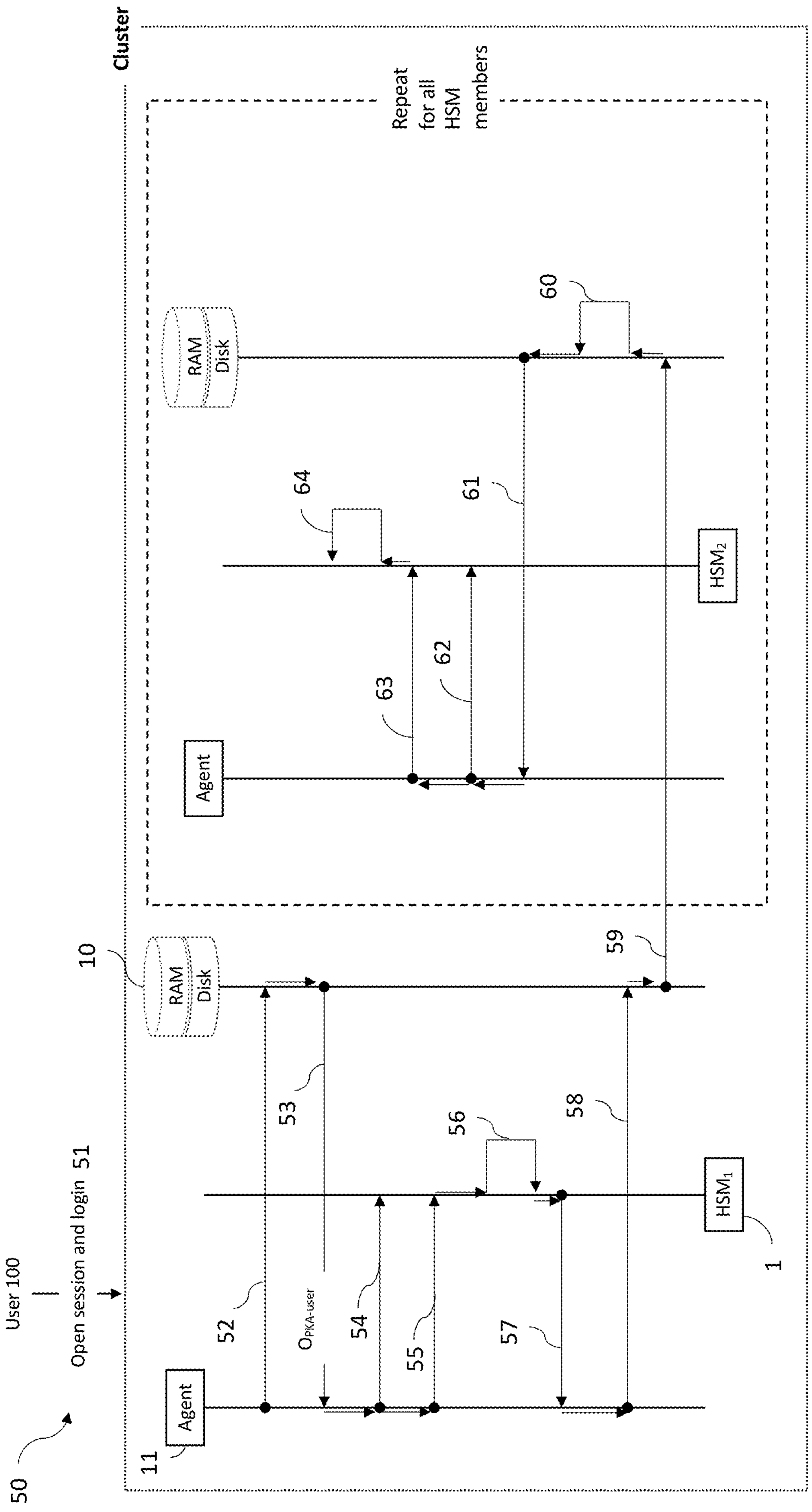
FIGS. 6*a* to 6*c* These figures show a detailed view of (a) an initial login for SSO, (b) a single logout via changed credential, and (c) a logout with continuous authentication.

FIG. 6*a* depicts a detailed view of an initial login for Single Sign On (50).

The PKA-based user object 6 or a modified form (e.g., the serial or blob 6.1) thereof is stored encrypted 6.2 in a database 10 outside or inside the HSM accessible via API, so that initiation of the associated end-user account retrieves this encrypted form from this RAM disk database and inserts it into the HSM for its decryption and authentication based on requesting the log-in credentials.

FIGS. 6*a* to 6*c*, and FIG. 8 depicts an "agent 11" which is a software entity that acts on the behalf of the application.

Therefore, method 50 is summarized as follows. A user 100 or end-user account opens session and logins 51 in the cluster via application or API. Then, the agent retrieves 52 the associated PKA-based user object ($O_{PKA-USER}$) encrypted from the database and instantiate it 54 in the $HSM_1$ 1. At this point, the $O_{PKA-USER}$ is inside the HSM but not authorized to use it yet. It will become authorized once the end-user account provides his credentials 55 (it may also be a challenge responder).

If authenticated, the $O_{PKA-USER}$ is cached 56 at session level in the HSM, and it is reverted to the agent 57 the authenticated state of the $O_{PKA-USER}$.

In step 58, it is created/cached a new session in the external database 10.

Then, as mentioned, the authenticated $O_{PKA-USER}$ is extracted out the HSM and propagated 59 towards other HSMs within the cluster. When the encrypted blob of the authenticated $O_{PKA-USER}$ reaches the second $HSM_2$, it is retrieved again 60 the associated $O_{PKA-USER}$ from an external RAM disk database (in-memory cache). Then, it is opened a new session with the $O_{PKA-USER}$ 61, instantiated 62 again in the $HSM_2$, automatically authorized 63 thanks to its already authorized state, and cache 64 in the $HSM_2$ at application level.

Figure 6B:
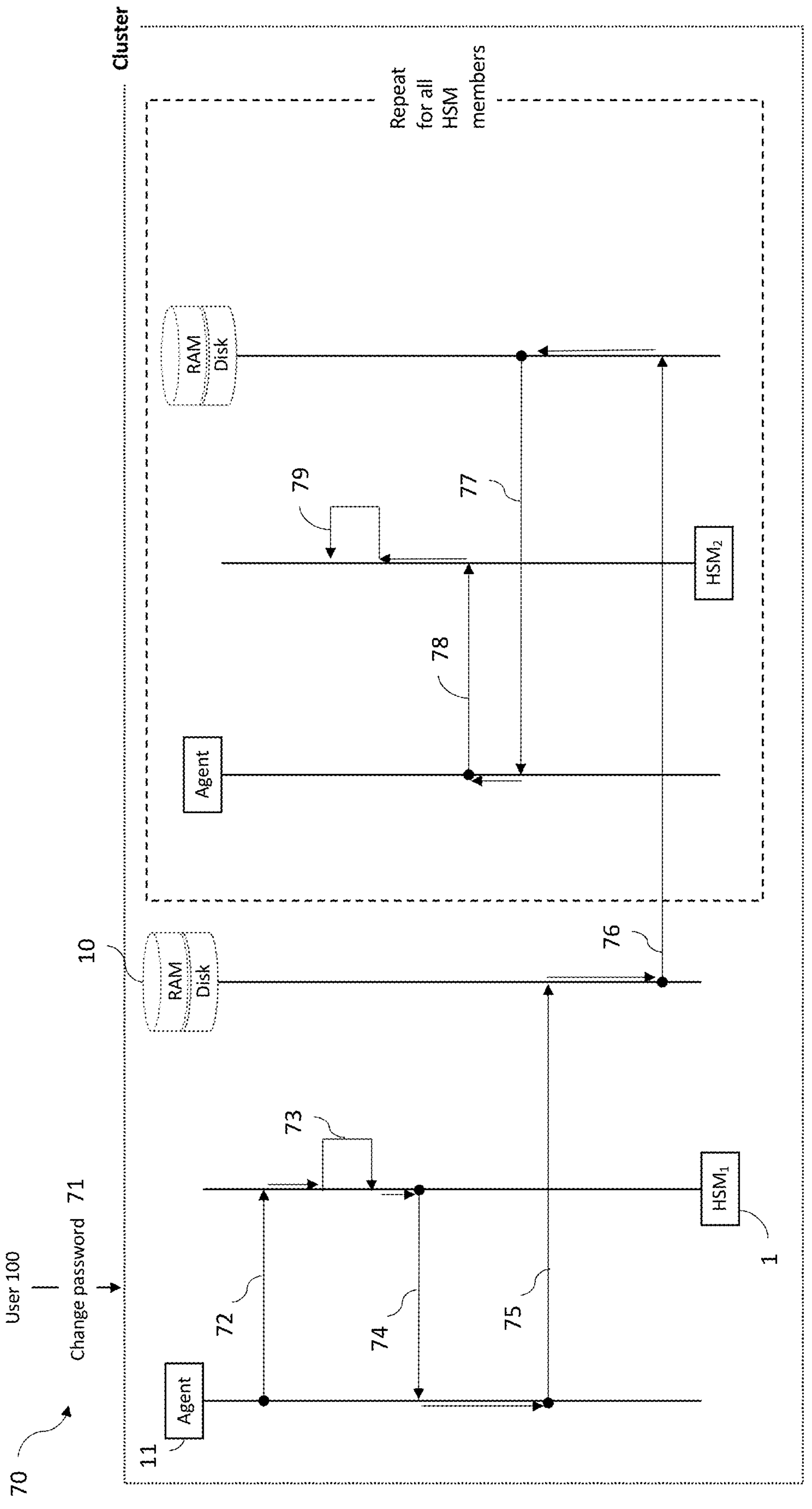

FIG. 6*b* depicts a single logout 70 via changed credential. Once the end-user ends session, the $O_{PKA-USER}$ is still stored in the database but its state has changed. As known, all the changes has to go through the HSM (i.e., has to be enforced by the HSM).

If the session expires, or the user logs-out, the $O_{PKA-USER}$ is again retrieved from the database and insert it into the HSM, modify its state in the attributes and track it out. Since the HSM does not trust "anybody" ("route of trust"), the state of the $O_{PKA-USER}$ cannot be modified externally. In other words, for any modification in its attributes or functions it must be inserted back into the HSM.

In other words, anytime the end-user logs-in, logs-out, modifies its state, or anything else, it has to go through the HSM (any HSM), because any HSM comprises the SMK already. Accordingly, there is no need to use the original HSM which is advantageously from the point of view of workload balance.

In this particular example, the user 100 wishes to change 71 his or her password. Therefore, the agent 11 requests to the HSM to set or modify 72 the $O_{PKA-USER}$. In the HSM, the password (attribute "authenticationData") is changed and it is revoked 73 everything in the session $O_{PKA-USER}$ context. Note that the $O_{PKA-USER}$ was cached at session level in the HSM.

In step 74, it is reverted back to the agent that the password has been changed. In step 75, ongoing session in the external database 10 is updated.

Then, this session removal of the $O_{PKA-USER}$ is propagated 76 to the other HSMs within the cluster.

When this command 76 reaches the second $HSM_2$, the associated $O_{PKA\text{-}USER}$ is retrieved from the external database removing its session 77 and reverting this information back to the agent 11. In step 78, the agent sends an instruction to the $HSM_2$ to update its internal cache with the changes, alike step 73 for the $HSM_1$. In this particular example, that update is a log-out of the session and finally, alike step 73 for the $HSM_1$, in the $HSM_2$ it is revoked 79 also everything in the session $O_{PKA\text{-}USER}$ context.

Figure 6C:
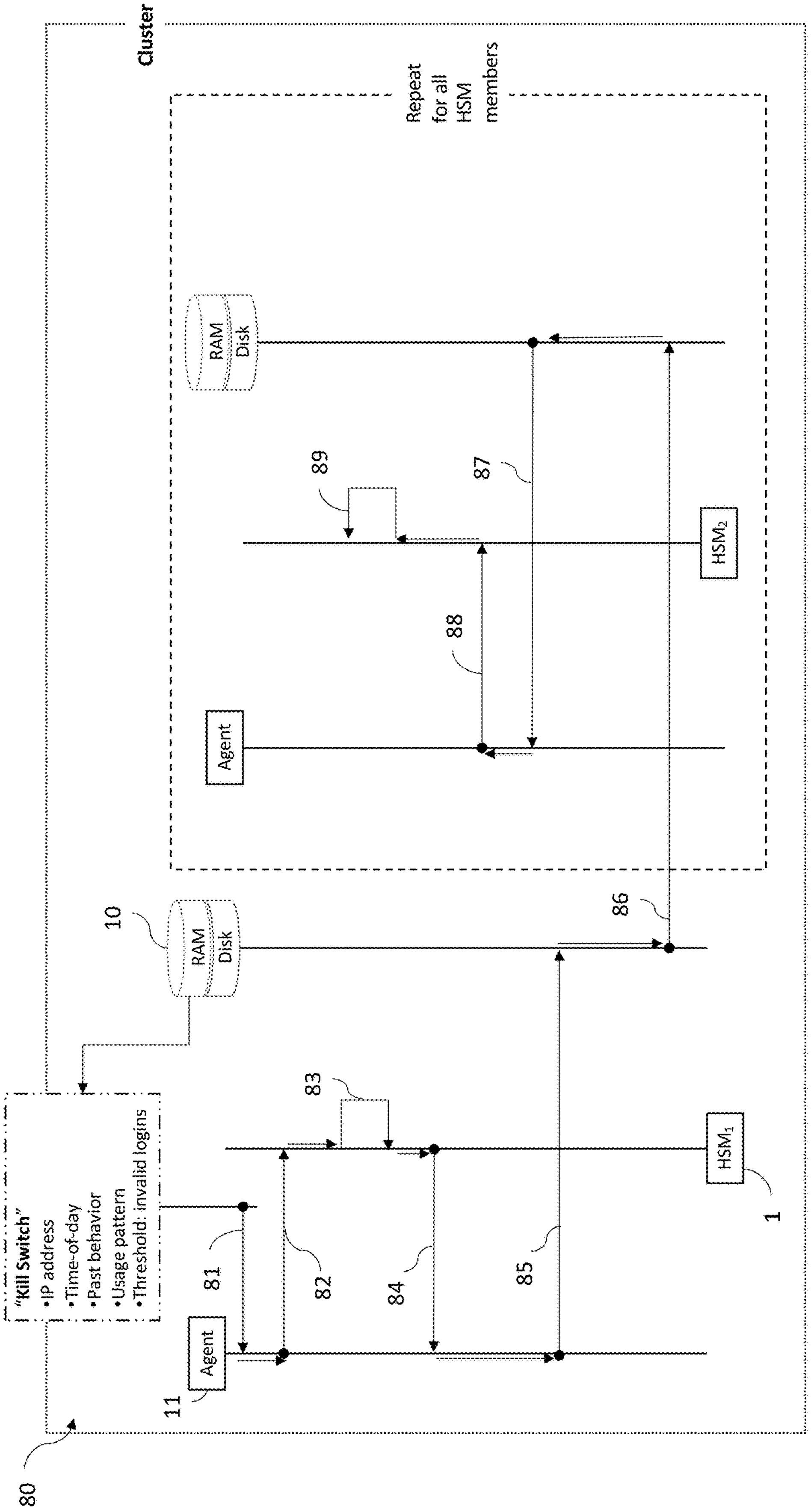

FIG. 6*c* depicts a logout with continuous authentication 80. Advantageously, it can be tracked the "IP address", "Time-of-day", "Past behavior", "Usage pattern", "invalid No. of logins" surpassing an established threshold in case a suspicious use is detected triggering a "Kill Switch" protocol. It further allows to use more trials on providing the right credentials in case someone uses the old cast version of the $O_{PKA\text{-}USER}$.

This "kill switch" protocol automatically prompts the agent 81 that a suspicious behavior has been detected and, accordingly, user 100 will be logout from any ongoing session.

As can be seen in FIG. 6*c*, the same steps as in FIG. 6*b* have been taken. Therefore, the same units have been kept in the reference numbers only changing the tens from 7× to 8×.

Figure 7:
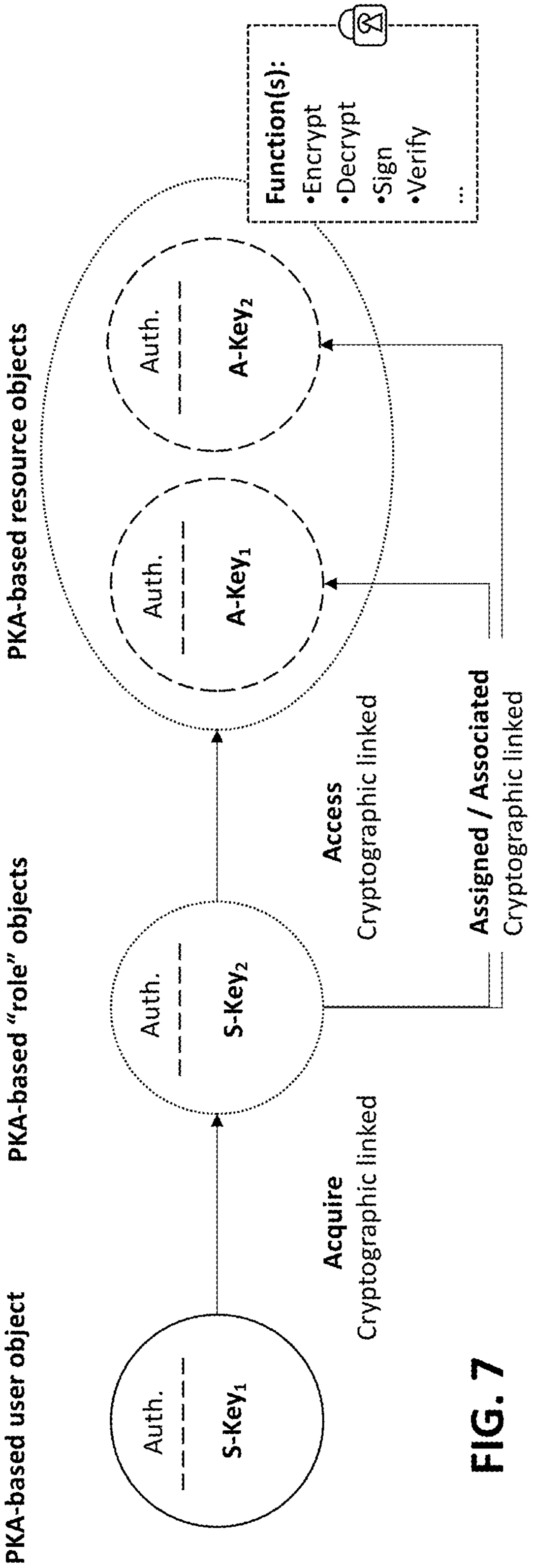
FIG. 7 This figure shows a schematic diagram of an RBA framework according to the invention.

FIG. 7 depicts a schematic diagram of an RBA framework for implementing access control to at least one cryptographic key stored within a HSM by an end-user account according to the invention.

The assignation of PKA-based resource objects (i.e., the keys) to specific PKA-based user objects is according to FIGS. 4*a* to 4*c*. In addition, to make this permission setting as complex as needed, further intermediate PKA-based objects with symmetry keys can be created to model the "roles". The creation and assignation is similar to the one explained for PKA-based resource objects and PKA-based user objects.

Figure 8:
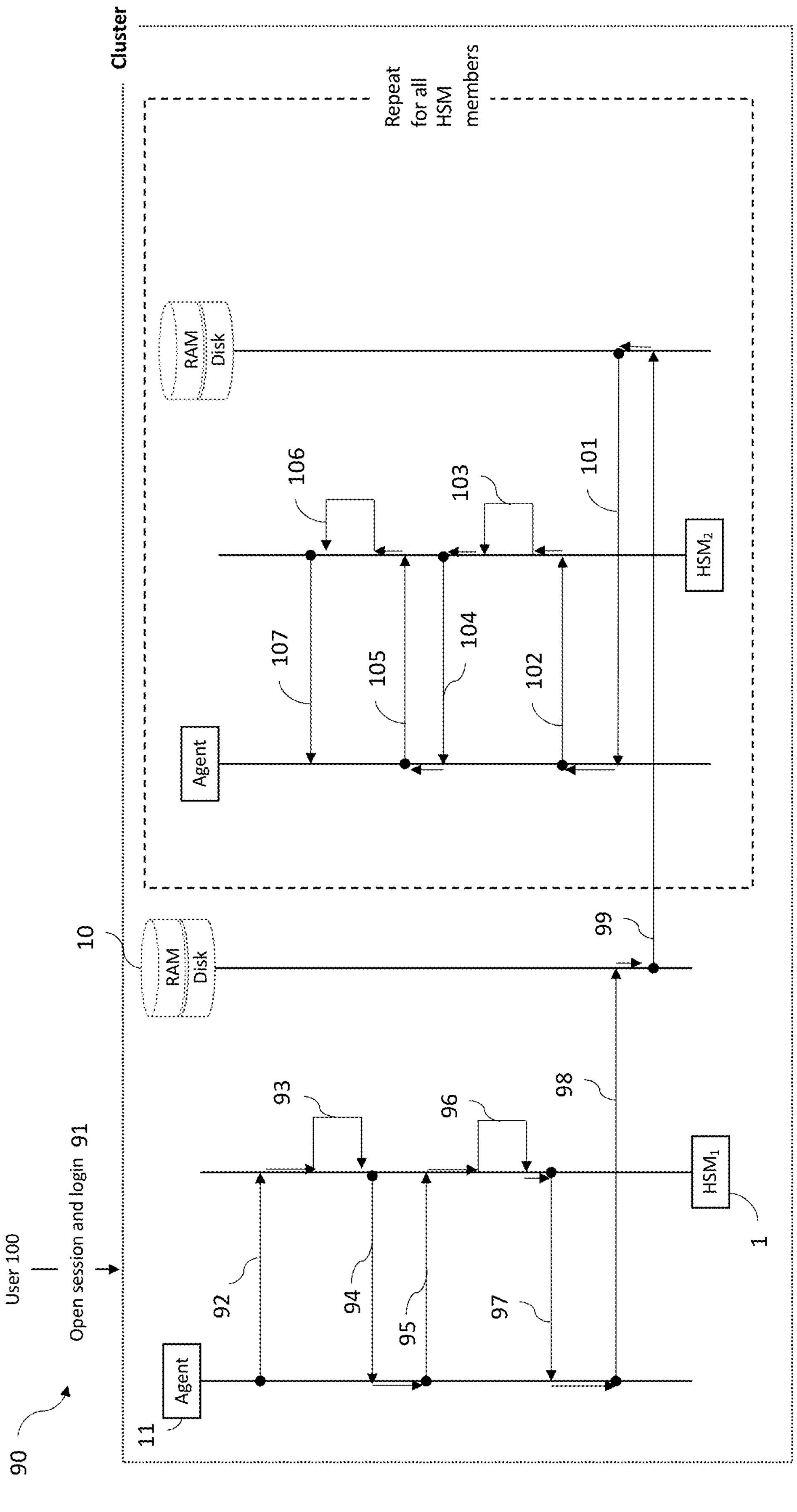
FIG. 8 This figure shows a detailed view of a session creation within a cluster of HSMs.

Finally, FIG. 8 depicts a detailed view of a session creation 90 within a cluster of HSMs using different resources.

As mentioned before, the user 100 logs in and open session 91 in the HSM. The agent 11 forwards 92 the user's credentials to the $HSM_1$. Then, the $HSM_1$ caches 93 an authentication PKA-based object (henceforth $O_{PKA\text{-}AUTH}$) at session level and reverts 94 to the agent the authenticated state.

Then, the agent requests 95 to open a resource session (i.e., a PKA-based object resource key, $O_{PKA\text{-}RESOURCE}$) with the S-key (symmetry key) of the $O_{PKA\text{-}AUTH}$. Next, the $HSM_1$ caches 96 the S-key, in case the $O_{PKA\text{-}RESOURCE}$ be cryptographically linked to the $O_{PKA\text{-}AUTH}$ and the latter could access it, the $HSM_1$ reverts 97 to the agent that the user is authorized to use the $O_{PKA\text{-}RESOURCE}$.

In step 98, it is created/cached a new session in the external database 10 for the following relationship: $OUID_{Auth.}$-$SessionID_{Auth.}$-$SessionID_{Resource.}$ Then, as mentioned, the new session ("$OUID_{Auth.}$-$SessionID_{Auth.}$-$SessionID_{Resource.}$") is propagated 99 towards other HSMs within the cluster. When the encrypted blob of this session reaches the second $HSM_2$, it is retrieved the associated session from the external database (in-memory cache) and, if found, the database informs 101 to the agent that the new session has been opened. The agent proceeds to the login 102 and the $HSM_2$ automatically caches 103 the $O_{PKA\text{-}AUTH}$ at session level.

After, the authenticated state is reverted back 104 to the agent, which requests 105 to open the resource session ($O_{PKA\text{-}RESOURCE}$) with the S-key of the $O_{PKA\text{-}AUTH}$. Then, the $HSM_2$ caches 106 the S-key at access/application level and reverts back 107 to the agent that the user can now use the $O_{PKA\text{-}RESOURCE}$.

The invention claimed is:

1. A method for operating a Hardware Security Module (HSM) for authenticating an end-user to at least one resource, comprising:

creating a Per-Key Authorization-based (PKA-based) user object, wherein the PKA-based user object is a PKA-based object that contains an authentication data required to access a cryptographic key stored by the PKA-based object, wherein the PKA-based user object comprising authentication data including log-in credentials of an end-user account and a symmetric cryptographic key associated with the end-user account accessible for performing cryptographic operations by the PKA-based user object by authentication to the PKA-based user object using the log-in credentials;

in a setup phase:

creating at least one PKA-based resource object, which is a PKA-based object, comprising:

generating an authentication data identifier;

encrypting the authentication data identifier with the symmetric cryptographic key included in the PKA-based user object to determine encrypted authentication data identifier; and storing the encrypted authentication data identifier as an encrypted credential;

in an access phase:

receiving, by the HSM, the log-in credentials of the end-user account for retrieving the PKA-based user object containing the log-in credentials from an external database; and authenticating, by the HSM, access to the PKA-based resource object by:

authenticating the PKA-based user object using a Public-Key Cryptographic Standard #11 to use the symmetric cryptographic key based on access permissions for the at least one PKA-based user object;

upon successful authentication to the PKA-based user object;

accessing, by the PKA-based user object, the symmetric cryptographic key;

decrypting, by the PKA-based user object, the encrypted credential using the symmetric cryptographic key to determine the authentication data identifier;

authenticating, by the PKA-based resource object, the authentication data identifier; and allowing access to the PKA-based resource object based on authenticating the authentication data identifier to determine an authenticated state of the PKA-based user object;

serializing, by the HSM, the PKA-based user object with the authenticated state of the PKA-based user object to determine a serial of the PKA-based user object;

encrypting said serial of the PKA-based user object, by the HSM, with the symmetric cryptographic key specific to each PKA-based user object or a derived form thereof shared among all PKA-based user objects to determine an encrypted serial of the PKA-based user object;

propagating, by the HSM, the encrypted serial of the PKA-based user object through a secure communication channel;

receiving, by at least a second HSM, the encrypted serial of the PKA-based user object;

decrypting the encrypted serial of the PKA-based user object, by the at least second HSM, with the symmetric cryptographic key; and automatically authenticating, by the at least second HSM, the PKA-based user object without providing the login credential of the end user account to access resource from the at least second HSM thereby transferring the authenticated state of the PKA-based user object between different HSM.

2. The method according to claim 1, wherein the symmetric cryptographic key is created in an assigned association state with the end-user account.

3. The method according to claim 1, wherein the PKA-based user object or a modified form thereof is encrypted and stored in a database outside of the HSM accessible via API, so that initiation of the end-user account retrieves encrypted PKA-based user object or modified form thereof from the database and inserts it into the HSM for decryption and authentication based on requesting the log-in credentials.

4. The method according to claim 3, wherein the encryption and decryption of the PKA-based user object or a modified form thereof is performed by the HSM using the symmetric cryptographic key.

5. The method according to claim 1, wherein the PKA-based user object is created by a Crypto Officer.

6. The method according to claim 1, wherein either a change of the log-in credentials of the end-user account or a log-out thereof revokes said PKA-based user object instantiated within the HSM at session level.

7. The method according to claim 1, wherein at least one the symmetric cryptographic key is created in unassigned association state with the end-user account being later late assigned thereto.

8. The method according to claim 1, wherein the authentication data identifier is a random string.

9. A method for single authentication of an end-user account within a cluster of Hardware Security Modules (HSMs) connected to each other through a secure communication channel, wherein the end-user account is represented by a Per-Key Authorization-based (PKA-based) user object, which is a PKA object that contains an authentication data required to access a cryptographic key stored by the PKA-based object, wherein the authentication data corresponds to a user, the method comprising the following steps:

authenticating, by a first HSM of the cluster of HSMs, the PKA-based user object by:

in a setup phase:

creating the PKA-based user object, comprising the authentication data corresponding to the user including log-in credentials of the end-user account and a symmetric cryptographic key associated with the end-user account accessible for performing cryptographic operations by the PKA-based user object by authentication to the PKA-based user object using the log-in credentials;

creating at least one PKA-based resource object, which is a PKA-based object, comprising:

generating an authentication data identifier;

encrypting the authentication data identifier with the symmetric cryptographic key included in the PKA-based user object to determine encrypted authentication data identifier;

storing the encrypted authentication data identifier as an encrypted credential;

in an access phase:

receiving, by the first HSM, the log-in credentials of the end-user account for retrieving the PKA-based user object containing the log-in credentials from an external database; and authenticating, by the first HSM, access to the PKA-based user object using a Public-Key Cryptographic Standard #11 to use the symmetric cryptographic key based on access permissions for the at least one PKA-based user object and upon successful authentication to the PKA-based user object:

accessing, by the PKA-based user object, the symmetric cryptographic key;

decrypting, by the PKA-based user object, the encrypted credential using the symmetric cryptographic key to determine the authentication data identifier;

authenticating, by the PKA-based resource object, the authentication data identifier; and allowing access to the PKA-based resource object based on authenticating the authentication data identifier thereby setting an authenticated state of the PKA-based user object;

serializing, by the first HSM, the PKA-based user object with the authenticated state of the PKA-based user object to determine a serial of the PKA-based user object;

encrypting said serial of the PKA-based user object, by the first HSM, with the symmetric cryptographic key specific to each PKA-based user object or a derived form thereof shared among all PKA-based user objects within the cluster of HSMS to determine an encrypted serial of the PKA-based user object;

propagating, by the first HSM, the encrypted serial of the PKA-based user object through the secure communication channel;

receiving, by at least a second HSM of the cluster, the encrypted serial of the PKA-based user object;

decrypting the encrypted serial of the PKA-based user object, by the at least second HSM, with the symmetric cryptographic key; and automatically authenticating, by the at least second HSM, the PKA-based user object without providing the login credential of the end user account to access resource from the at least second HSM thereby transferring authenticated state of the PKA-based user object between different HSM of the cluster of HSMs.

10. The method according to claim 9, wherein the secure communication channel implements a cryptographic protocols of a Transport Layer Security.

11. The method according to claim 9, wherein the first HSM of the cluster propagates the encrypted serial through the secure communication channel only to one or more HSMs storing the symmetric cryptographic key associated with the end-user account.

12. The method according to claim 9, wherein the authentication data identifier is a random string.

13. A method for implementing access control to at least one cryptographic key stored within a Hardware Security Module (HSM) by an end-user account, wherein the method comprises:

creating a Per-Key Authorization-based (PKA-based) user object, wherein the PKA-based user object is a PKA-based object that contains an authentication data required to access a cryptographic key stored by the PKA-based object, wherein the PKA-based user object comprising authentication data including log-in credentials of an end-user account and a symmetric cryptographic key associated with the end-user account accessible for performing cryptographic operations by the PKA-based user object by authentication to the PKA-based user object using the log-in credentials;

in a setup phase:

creating at least one PKA-based resource object, which is a PKA-based object, comprising:

generating an authentication data identifie;

encrypting the authentication data identifier with the symmetric cryptographic key included in the PKA-based user object to determine encrypted authentication data identifier;

storing the encrypted authentication data identifier as an encrypted credential;

in an access phase:

receiving, by the HSM, the log-in credentials of the end-user account for retrieving the PKA-based user object containing the log-in credentials from an external database; and authenticating, by the HSM, access to the PKA-based resource object by:

authenticating to the PKA-based user object using a Public-Key Cryptographic Standard #11 to use the symmetric cryptographic key based on access permissions set for the at least one PKA-based user object;

upon successful authentication to the PKA-based user object;

accessing, by the PKA-based user object, the symmetric cryptographic key;

decrypting, by the PKA-based user object, the encrypted credential using the symmetric cryptographic key to determine the authentication data identifier;

authenticating, by the PKA-based resource object, the authentication data identifier; and allowing access to the PKA-based resource object to determine an authenticated state of the PKA-based user object;

serializing, by the HSM, the PKA-based user object with the authenticated state of the PKA-based user object to determine a serial of the PKA-based user object;

encrypting said serial of the PKA-based user object, by the HSM, with the symmetric cryptographic key specific to each PKA-based user object or a derived form thereof shared among all PKA-based user objects to determine an encrypted serial of the PKA-based user object;

propagating, by the HSM, the encrypted serial of the PKA-based user object through a secure communication channel;

receiving, by at least a second HSM, the encrypted serial of the PKA-based user object;

decrypting the encrypted serial of the PKA-based user object, by the at least second HSM, with the symmetric cryptographic key; and automatically authenticating, by the at least second HSM, the PKA-based user object without providing the login credential of the end user account to access resource from the at least second HSM thereby transferring the authenticated state of the PKA-based user object between different HSM.

14. The method according to claim 13, wherein the PKA-based resource object comprises sensitive and non-sensitive attributes wherein, the non-sensitive attributes comprise the encrypted authentication data identifier, and the sensitive attributes comprise the at least one symmetric cryptographic key.

15. The method according to claim 13, wherein the authentication data identifier is a random string.

16. The method according to claim 13, wherein the PKA-based resource object is assigned to the PKA-based user object by setting a read-only parent attribute of the PKA-based user object.

17. The method according to claim 16, wherein the access permissions are set up for each PKA-based resource object by the command set of its supported functions of the public-key cryptographic standard #11 (PKCS #11).

18. The method according to claim 17, wherein the access permissions are at least one of the following:

allow encryption, allow decryption, allow wrap, allow unwrap, allow signing, allow verifying.

* * * * *